United States Patent Office 3,475,382
Patented Oct. 28, 1969

3,475,382
GROUP I-A AND IV-A METAL CYANAMIDE TRANSESTERIFICATION CATALYSTS IN PREPARATION OF POLYETHYLENE TEREPHTHALATE
Mary J. Stewart, Riddlewood, Media, and John A. Price, Swarthmore, Pa., assignors to FMC Corporation, Philadelphia, Pa., a corporation of Delaware
No Drawing. Filed Apr. 26, 1967, Ser. No. 633,720
Int. Cl. C08g *17/13*
U.S. Cl. 260—75
4 Claims

ABSTRACT OF THE DISCLOSURE

Process of preparing polyethylene terephthalate resin comprising carrying out a transesterification reaction between dimethyl terephthalate and ethylene glycol in the presence of a suitable metal salt of carbamic acid nitrile and then polycondensing the resulting product.

---

This invention relates to a method of preparing linear polyesters from a suitable diol and an ester of a dicarboxylic acid. More particularly, it relates to an improved method for preparing polyethylene terephthalate resin, which is suitable for filament-forming purposes, through the use of an improved transesterification catalyst.

The production of high molecular weight linear polyester resin from a dialkyl terephthalate and glycol is well-known in the art. In the preparation of polyesters from such compounds, the dialkyl terephthalate and glycol are first combined and subjected to an ester-interchange or transesterification reaction in the presence of a transesterification catalyst at elevated temperature and atmospheric pressure. The resulting product is then polycondensed at higher temperatures and under reduced pressure in the presence of a polycondensation catalyst to form the desired polyester resin.

Polyethylene terephthalate suitable for melt spinning into filaments should have a carboxyl content value of preferably about or below 50 equivalents per million grams (eq./$10^6$ gr. or meq./kg.), a melting point of at least about 258-260° C. and an intrinsic viscosity preferably not less than about 0.60, as determined in a 60% phenol and 40% tetrachloroethane solution (wt./wt.) at 30° C. Additionally, for a number of polyester fiber uses, it is necessary that the polyester resin have a diethylene glycol content of less than 1% by weight in order for the fibers formed therefrom to possess a high level of hydrolytic and thermal stability. Any polyester resin having a diethylene glycol content of less than 0.50% is generally considered excellent for the preparation of fibers having such stability.

In the commercial production of polyester resin, it is obviously desirable to produce resin in the shortest possible time and yet achieve the desired degree of polymerization. In the manufacture of polyethylene terephthalate from dimethyl terephthalate and ethylene glycol, the effectiveness of the transesterification catalyst used to bring about the ester-interchange or transesterification reaction between these two reactants may be measured by measuring the "half-time" of the catalyst. The "half-time" of the catalyst is defined as the time necessary for the first one-half of the theoretical amount of methyl alcohol that will be produced during the transesterification reaction to distill from the transesterification reaction mixture. It is desirable that the half-time be as short as possible, preferably less than 60 minutes; however, it is essential that the transesterification catalyst, in any case, act to produce a polyester prepolymer suitable for condensation to a high molecular weight linear polyester.

It is an object of this invention to provide a method for preparing high molecular weight linear polyesters.

Another object of the present invention is to provide an improved method for accelerating the transesterification reaction between ethylene glycol and dimethyl terephthalate in the preparation of polyethylene terephthalate.

These and other objects are accomplished in accordance with the present invention which involves a method of preparing polyethylene terephthalate wherein dimethyl terephthalate and ethylene glycol are transesterified and the resulting transesterified product is polycondensed in the presence of a polycondensation catalyst, the improvement comprising carrying out the said transesterification reaction in the presence of a catalytic amount of a suitable metal salt of carbamic acid nitrile.

The metal salts of carbamic acid nitrile that are used as catalysts in the transesterification step of the present method may be suitably varied to meet requirements of reaction condition and desired product. However, it has been found that the preferred salts are those formed with metals from Groups I-A and IV-A of the Periodic Table (see Merck Index, Sixth Edition, Inside Front Cover). For example, among the transesterification catalysts that can be used in the present method are lead cyanamide and sodium cyanamide or any combination thereof.

Generally, concentrations of the present transesterification catalyst in the range of from about 0.01% to about 0.2%, based on the weight of dimethyl terephthalate in the subject dimethyl terephthalate-ethylene glycol reaction mixture is used. Usually, it has been found that from about 0.02% to about 0.10% of the present salts of carbamic acid nitrile, based on the weight of the dimethyl terephthalate in the reaction mixture, is preferred to produce linear polyester resins suitable for forming filaments. Higher or lower concentrations of the present catalyst can also be used. However, when concentrations less than the above are used, their catalytic effect is generally reduced, whereas if concentrations greater than this are used, no further improvement in the present method or desired product is obtained.

The preparation of filament-forming polyesters of the present invention via the ester-interchange reaction is carried out with a molar ratio of ethylene glycol to dimethyl terephthalate of from about 1:1 to about 15:1, but preferably from about 1.2:1 to about 2.6:1. The ester-interchange reaction is generally carried out at atmospheric pressure in an inert atmosphere, such as nitrogen, initially at a temperature range of from about 125° C. and about 250° C., but preferably between about 150° C. and 200° C. in the presence of an ester-interchange catalyst. During this first stage, methyl alcohol is evolved and is continuously removed by distillation. After a reaction period of about one to two hours, the temperature of the reaction mixture is raised to about from 200° C. to about 300° C. for approximately ½ to 2 hours in order to complete the reaction and distill off excess glycol. The main and desired product of the ester-interchange reaction is the prepolymer which is comprised principally of bis(2-hydroxyethyl)terephthalate. The second stage or polycondensation step of the present method is generally achieved under reduced pressure within the range of from about 225° C. to about 325° C. for about 3–5 hours. It is preferable to carry out both the first and second stage of the present method under agitation.

The polycondensation step of the present method is generally accomplished through the addition of a suitable catalyst, for example, antimony trioxide, and the like. The polycondensation catalyst may be added to the present reaction mixture before initiating the ester-interchange reaction between the ethylene glycol and dimethyl terephthalate or after the product thereof is formed. The polycondensation catalysts are generally employed in amounts ranging from about 0.005 to about 0.5%, based on the total weight of reactants.

The following examples of several preferred embodiments will further serve to illustrate the present invention. All parts are by weight, unless otherwise indicated.

Example I

A mixture comprising 600 g. of dimethyl terephthalate, 396 ml. of ethylene glycol and 0.24 g. of lead cyanamide were charged into a reaction vessel equipped with a nitrogen inlet, a vacuum source, distillation arm, heating means and stirring means. The reaction mixture was agitated and heated under atmospheric pressure to about 198° C. over a period of about 30 minutes, under a nitrogen blanket, whereby by-product methyl alcohol was distilled off. The reaction mixture was maintained at this temperature and under these conditions for about two hours. Then the temperature of the reaction mixture was allowed to rise in order to distill off any remaining by-product comprising methyl alcohol and glycol and form the polyester prepolymer. After about 30 minutes, the temperature had risen to about 230° C., at which time the formed polyester prepolymer was cooled under a nitrogen blanket.

The half-time of the lead cyanamide catalyst was 16 minutes.

Example II

Fifty grams of the resulting prepolymer of Example I was combined with 0.02 gram of antimony trioxide in a reaction vessel equipped with a nitrogen inlet, a vacuum source, a distillation arm, stirring means and heating means. Pressure within the reaction vessel was reduced to from about 0.1 to about 0.05 mm. of mercury at 285° C. under a nitrogen blanket and the reaction mixture was agitated under these conditions for about three hours to bring about polycondensation of the prepolymer and formation of the polyester resin. The resin obtained had an intrinsic viscosity of 0.84, a melting point of about 264° C., a carboxyl content value of 14.5 (meq./kg.) and a diethylene glycol content of 0.35%.

Example III

A mixture comprising 600 g. of dimethyl terephthalate, 396 ml. of ethylene glycol and 0.24 g. of sodium cyanamide were charged into a reaction vessel equipped with a nitrogen inlet, a vacuum source, distillation arm, heating means and stirring means. The reaction mixture was agitated and heated under atmospheric pressure to about 198° C. over a period of about 30 minutes, under a nitrogen blanket whereby by-product methyl alcohol was distilled off. The reaction mixture was maintained at this temperature and under these conditions for about two hours. Then the temperature of the reaction mixture was allowed to rise in order to distill off any remaining by-product comprising methyl alcohol and glycol and form the polyester prepolymer. After about 30 minutes, the temperature had risen to about 230° C., at which time the formed polyester prepolymer was cooled under a nitrogen blanket.

The half-time of the sodium cyanamide catalyst was 27 minutes.

Example IV 50 grams of the resulting prepolymer of Example III was combined with 0.02 g. of antimony trioxide in a reaction vessel equipped with a nitrogen inlet, a vacuum source, a distillation arm, stirring means and heating means. Pressure within the reaction vessel was reduced to form about 0.1 to about 0.05 mm. of mercury at 285° C. under a nitrogen blanket and the reaction mixture was agitated under these conditions for about three hours to bring about polycondensation of the prepolymer and formation of the polyester resin. The resin obtained had an intrinsic viscosity of 0.79, a melting point of about 266° C., a carboxyl content value of 11.5 (meq./kg.) and a diethylene glycol content of 0.45%.

The intrinsic viscosities of the polyester products in the above examples were determined in a 60% phenol and 40% tetrachloroethane solution (wt./wt.) at 30° C. The other analytical values of the prepolymer and resin products were determined through the use of conventional quantitative laboratory measuring procedures.

The results in the above examples indicate that the presence of suitable salts of carbamic acid nitrile, for example, lead cyanamide and sodium cyanamide, during the transesterification reaction betwen dimethyl terephthalate and ethylene glycol, facilitates the preparation of and improves the polyester prepolymer formed, and in turn, the resulting polyester product.

Through the use of the present method, the transesterification reaction is accelerated, as indicated by the low half-times of the transesterification catalysts, and a product is formed which is suitable for polycondensation into a highly polymeric polyester resin.

The polyester products formed from these prepolymers have high molecular weights, as indicated by their intrinsic viscosities, high melting points, low carboxyl contents, and exceptionally low diethylene glycol content values, so as to make them particularly valuable in the preparation of high quality polyester filaments.

While the process of the present invention has been described with particular reference to polyethylene terephthalate, it will be obvious that the present invention includes within its scope the preparation of other similar polymeric polymethylene terephthalates. For example, it includes within its scope the preparation of other polymeric polymethylene terephthalates formed from glycols of the series $HO(CH_2)_nOH$, wherein $n$ is 2 to 10 and various dialkyl esters of terephthalic acid and copolyesters formed from combinations with other esters of suitable dicarboxylic acids such as isophthalic acid.

We claim:
1. In a process for the preparation of highly polymeric polyethylene terephthalate resin wherein dimethyl terephthalate and ethylene glycol are transesterified and the resulting transesterified product is polycondensed in the presence of a polycondensation catalyst, the improvement comprising carrying out the said transesterification in the presence of a catalytic amount of a metal salt of carbamic acid nitrile transesterification catalyst wherein the metal component of said salt is from Groups I–A or IV–A of the Periodic Table (Merck Index, Sixth Edition).

2. The process of claim 1 wherein the salt is present in an amount of from 0.01% to about 0.20%, based on the weight of the dimethyl terephthalate in the reaction mixture.

3. The process of claim 1 wherein the salt is lead cyanamide.

4. The process of claim 1 wherein the salt is sodium cyanamide.

References Cited

UNITED STATES PATENTS 2,739,957   3/1956   Billica et al. _____ 260—75

WILLIAM H. SHORT, Primary Examiner

LOUISE P. QUAST, Assistant Examiner

U.S. Cl. X.R.

260—475

UNITED STATES PATENT OFFICE
CERTIFICATE OF CORRECTION

Patent No. 3,475,382  Dated October 28, 1969

Inventor(s) Mary J. Stewart and John A. Price

It is certified that error appears in the above-identified patent and that said Letters Patent are hereby corrected as shown below:

Column 2, line 49, "and" should be --to--.  Column 3, line 69, "form" should be --from--.

SIGNED AND
SEALED
FEB 17 1970

(SEAL)
Attest:

Edward M. Fletcher, Jr.
Attesting Officer

WILLIAM E. SCHUYLER, JR.
Commissioner of Patents